US01205537B2

(12) United States Patent
Mahiout et al.

(10) Patent No.: US 12,055,037 B2
(45) Date of Patent: Aug. 6, 2024

(54) METHOD FOR IDENTIFYING ENVIRONMENTAL EFFECTS IN DOWNHOLE DATA FOR HYDROCARBON SATURATION ESTIMATION

(71) Applicant: Saudi Arabian Oil Company, Dhahran (SA)

(72) Inventors: Mohamed Said Mahiout, Dhahran (SA); Faisal Naif Enezi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 208 days.

(21) Appl. No.: 17/472,010

(22) Filed: Sep. 10, 2021

(65) Prior Publication Data

US 2023/0084947 A1    Mar. 16, 2023

(51) Int. Cl.
*E21B 44/00* (2006.01)
*E21B 49/00* (2006.01)
(Continued)

(52) U.S. Cl.
CPC ............ *E21B 49/00* (2013.01); *E21B 44/00* (2013.01); *G01V 3/26* (2013.01); *G01V 3/38* (2013.01); *G06N 20/00* (2019.01)

(58) Field of Classification Search
CPC .......... E21B 49/00; E21B 44/00; E21B 47/00; E21B 2200/22; G01V 3/26; G01V 3/38; G06N 20/00
See application file for complete search history.

(56) References Cited

U.S. PATENT DOCUMENTS 10,430,725 B2   10/2019   Anderson et al.
10,977,489 B2    4/2021   Paz et al.
(Continued)

FOREIGN PATENT DOCUMENTS

WO       2018208634        11/2018
WO   WO-2022040393 A1 *    2/2022

OTHER PUBLICATIONS

Liu et al., "Deep Learning Inversion of Electrical Resistivity Data" IEEE Transcations of Geoscience and Remote Sensing, Jan. 2020, 14 pages.
(Continued)

*Primary Examiner* — Catherine T. Rastovski
*Assistant Examiner* — Yossef Korang-Beheshti
(74) *Attorney, Agent, or Firm* — Fish & Richardson P.C.

(57) ABSTRACT

Methods and systems for drilling a well into a subsurface formation are configured for performing a downhole measurement to generate measured logging-while-drilling (LWD) data; retrieving a machine learning model that is trained using labeled LWD data, the labeled LWD data representing one or more environmental effects each causing a respective data signature in the LWD data, each respective data signature being associated with a corresponding label identifying the environmental effect; inputting the LWD data into the machine learning model; generating, by the machine learning model based on the inputting, a classification output representing at least one environmental effect represented in the LWD data; and generating, based on the classification output, corrected LWD data that removes a change to the LWD data caused by the environmental effect. The systems and methods are configured for drilling a well into the subsurface based on the corrected LWD data.

18 Claims, 12 Drawing Sheets

(51) Int. Cl.
  *G01V 3/26*      (2006.01)
  *G01V 3/38*      (2006.01)
  *G06N 20/00*     (2019.01)

(56) References Cited

U.S. PATENT DOCUMENTS

| | | | | |
|---|---|---|---|---|
| 2004/0010373 | A1* | 1/2004 | Smits | G01V 11/00 |
| | | | | 702/6 |
| 2004/0090234 | A1* | 5/2004 | Macune | G01V 3/30 |
| | | | | 324/338 |
| 2018/0135409 | A1* | 5/2018 | Wilson | G01V 3/30 |
| 2019/0147125 | A1  | 5/2019 | Yu et al. | |
| 2019/0383965 | A1* | 12/2019 | Salman | G01V 11/00 |
| 2020/0149354 | A1* | 5/2020 | Singh | G06N 20/00 |

OTHER PUBLICATIONS

Mahiout et al., "Advanced Resistivity Modeling To Enhance Vertical And Horizontal Well Formation Evaluation" Society of Petroleum Engineers, SPE-203347-MS, Nov. 2020, 18 pages.

Sedova et al., "Acoustic Land Full Waveform Inversion on a Broadband Land Dataset: the Impact of Optimal Transport." 81st EAGE Conference and Exhibition 2019. vol. 2019. No. 1. European Association of Geoscientists & Engineers, Jun. 2019, 5 pages.

* cited by examiner

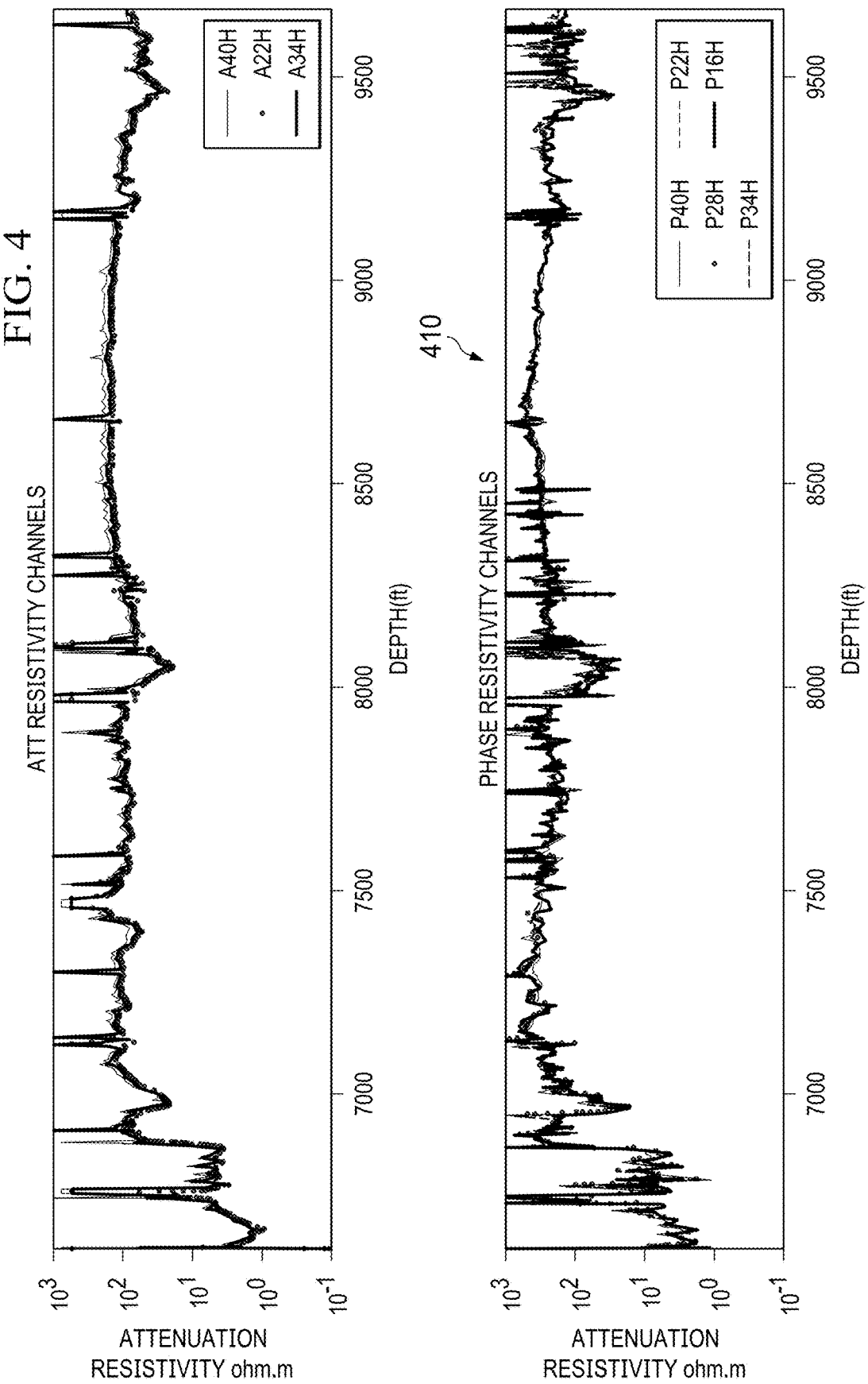

METHOD FOR IDENTIFYING ENVIRONMENTAL EFFECTS IN DOWNHOLE DATA FOR HYDROCARBON SATURATION ESTIMATION

TECHNICAL FIELD

The specification generally relates to oil and gas exploration. More specifically, the specification describes methods and systems related to drilling wells into the deep subsurface and analysis of corresponding well data.

BACKGROUND

Wells drilled into deep subsurface regions, such as for hydrocarbon production or other purposes, are associated with log data that represents well properties that provide guidance as to how the well should be drilled. To map geologic features in a subsurface region near or at the well bore, resistivity data are acquired from in the well bore. The resistivity data include a measurement of the resistivity in rock as a function of depth or position in the subsurface. Measured resistivity values provide an indication of changes in lithology or structure in regions of the subsurface.

SUMMARY

This specification describes an approach for drilling wells into the deep subsurface, such as vertical or near-vertical wells. A system (such as a data processing system) is configured to identify one or more environmental effects in logging-while-drilling (LWD) data acquired from a subsurface region during drilling in the subsurface region. Generally, the LWD data include data acquired during drilling of a well. The data can include a resistivity value measured at or near a drill bit. The data processing system is configured to recognize features in the LWD data (and/or wireline data) to identify different environmental effects in the data. The data processing system is configured to automatically determine which environmental effects are occurring in the wireline or LWD data as represented in resistivity log responses in vertical and HAHZ wells. The data processing system is configured to automatically identify that the environmental effect occurred based on features in the wireline or LWD data and generate an alert or otherwise flag the data corresponding to the identified environmental effect.

In a general aspect, a method for drilling a well into a subsurface formation includes performing a downhole measurement to generate measured logging-while-drilling (LWD) data. The method includes retrieving a machine learning model that is trained using labeled LWD data, the labeled LWD data representing one or more environmental effects each causing a respective data signature in the LWD data, each respective data signature being associated with a corresponding label identifying the environmental effect. The method includes inputting the LWD data, generated based on the downhole measurement, into the machine learning model. The method includes generating, by the machine learning model based on the inputting, a classification output representing at least one environmental effect represented in the LWD data. The method includes generating, based on the classification output, corrected LWD data that removes a change to the LWD data caused by the environmental effect.

In some implementations, the method includes drilling a well into the subsurface based on the corrected LWD data.

In some implementations, the RWD data includes resistivity data, wherein each respective data signature includes a resistivity phase signature and an associated resistivity attenuation signature, and wherein the corrected RWD data represents a true resistivity value (Rt) for the subsurface formation at a location of the downhole measurement.

In some implementations, the resistivity phase signature represents an increasing or decreasing phase shift resistivity with respect to a baseline phase shift resistivity, and the resistivity attenuation signature represents an increasing or decreasing attenuation resistivity with respect to a baseline attenuation resistivity.

In some implementations, the one or more environmental effects each include one of a shoulder bed effect, an invasion effect, an anisotropy effect, or a dielectric effect.

In some implementations, the machine learning model comprises a supervised machine learning model.

In some implementations, the method includes performing a data quality check for the measured LWD data, the data quality check configured to remove data comprising missing values, out of range values, saturated sensor values, or values from a damaged sensor.

In some implementations, the sensor comprises an electrode.

In a general aspect, a system for drilling a well into a subsurface formation includes one or more sensors for generating logging-while-drilling (LWD) data, one or more processors, and a memory storing instructions that, when executed by the one or more processors, cause the one or more processors to perform operations. The operations include receiving, from the one or more sensors, the LWD data. The operations include retrieving a machine learning model that is trained using labeled LWD data, the labeled LWD data representing one or more environmental effects each causing a respective data signature in the LWD data, each respective data signature being associated with a corresponding label identifying the environmental effect. The operations include inputting the LWD data, generated based on the downhole measurement, into the machine learning model. The operations include generating, by the machine learning model based on the inputting, a classification output representing at least one environmental effect represented in the LWD data. The operations include generating, based on the classification output, corrected LWD data that removes a change to the LWD data caused by the environmental effect.

In a general aspect, one or more non-transitory computer readable media store instructions for drilling a well into a subsurface formation. The instructions, when executed by one or more processors, are configured to cause the one or more processors to perform operations comprising: receiving measured logging-while-drilling (LWD) data during a downhole measurement; retrieving a machine learning model that is trained using labeled LWD data, the labeled LWD data representing one or more environmental effects each causing a respective data signature in the LWD data, each respective data signature being associated with a corresponding label identifying the environmental effect; inputting the LWD data, generated based on the downhole measurement, into the machine learning model; generating, by the machine learning model based on the inputting, a classification output representing at least one environmental effect represented in the LWD data; and generating, based on the classification output, corrected LWD data that removes a change to the LWD data caused by the environmental effect.

The implementations described throughout this specification enable one or more of the following advantages. Conventional methods for correction of environmental effects can depend on a judgement or experience of users, which is time consuming. Manual review can cause resulting inconsistencies between or among logs in different wells across a same field/reservoir because of differing judgements of different experts. The data processing system is configured for automatic identification and flagging of different environmental effects on wireline and LWD measurements, through a supervised machine learning approach. The machine learning model is trained to recognize the different environmental effects. Logic of the trained machine learning model is executed by the data processing system to predict environmental effect(s) for acquired resistivity data. In some implementations, the data processing system flags the data as being affected by the environmental effect. In some implementations, the identified environmental effects are corrected in a resistivity modeling workflow in which the data processing system extract a true resistivity profile ($R_t$).

The data processing system is configured to identify environmental effects in high-angle/horizontal (HAHz) wells and/or vertical wells. The data processing system standardizes the model for identification of the environmental effects to reduce or eliminate inconsistencies across wellbores in a subsurface.

The details of one or more embodiments of these systems and methods are set forth in the accompanying drawings and the description to be presented. Other features, objects, and advantages of these systems and methods will be apparent from the description and drawings, and from the claims.

BRIEF DESCRIPTION OF DRAWINGS

FIG. 4 shows example LWD data.

Like reference symbols in the various drawings indicate like elements.

DETAILED DESCRIPTION

Figure 1:
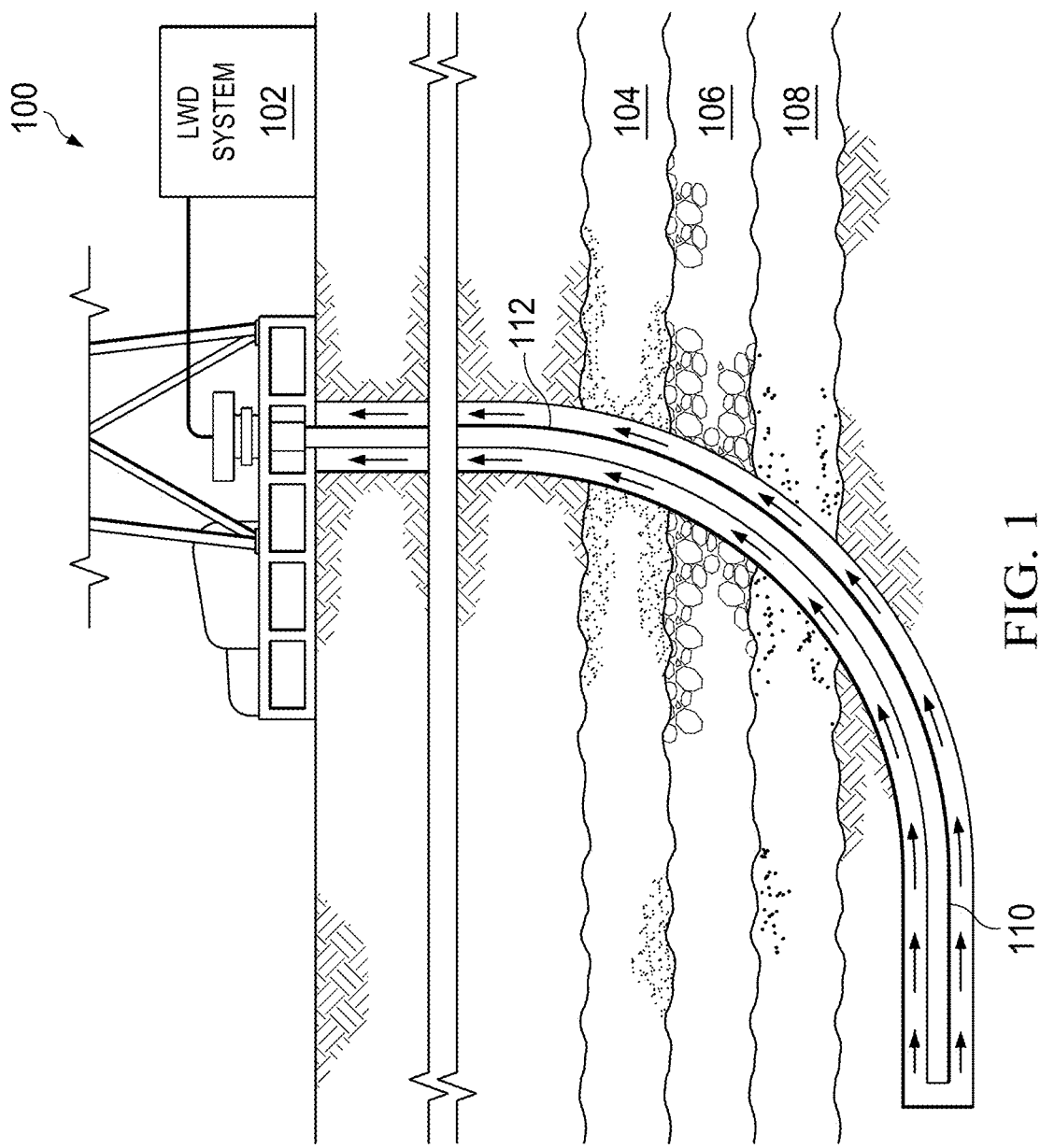
FIG. 1 is a schematic view of a system for generation of LWD data for transmission in real-time to the surface.

This specification describes an approach for drilling wells into the deep subsurface, such as vertical or near-vertical wells. A system (such as a data processing system) is configured to identify one or more environmental effects in logging-while-drilling (LWD) data acquired from a subsurface region during drilling in the subsurface region. The data processing system is configured to train and execute machine learning models for identifying different environmental effects in the LWD data. In some implementations, the data processing system is configured to modify or correct the LWD data so that a more accurate representation of the subsurface, based on the modified LWD data, is presented.

Generally, the LWD data include data acquired during drilling of a well. In some examples, the LWD data are acquired from hardware coupled to a bottom-hole assembly (BHA). The LWD data are measured in the well bore and during drilling, and can be extracted periodically (such as after the LWD tools are removed from the well bore). The data acquired as part of LWD data can include resistivity data (such as ohm-m), representing attenuation and phase-shift resistivities at different transmitter spacings and frequencies. The data can include a resistivity value measured at or near a drill bit. The resistivity data can include deep directional resistivities. The LWD data can include sonic data, such as compressional slowness ($\Delta tc$) or shear slowness ($\Delta ts$) data. Similar to other LWD tools, sonic data is being transmitted in real-time to the surface. Other LDW data can be gathered, including nuclear magnetic resonance (NMR) data, formation pressure and fluid sampling, borehole imaging, neutron porosity measurements, density measurements, or gamma ray measurements. In some implementations, the data are wireline data in addition to or instead of LWD data.

The data processing system is configured to recognize features in the LWD data (and/or wireline data) to identify different environmental effects in the data. For example, environmental effects can include detection of a shoulder-bed (or adjacent bed) effect. This effect occurs when an adjacent bed affects measurements (such as resistivity values) of the LWD data or wireline data (hereinafter LWD data). For example, high-resistivity beds adjacent to a low-resistivity bed may result in more current flowing in the low-resistivity bed than if the high-resistivity beds were not present, thus changing the apparent resistivity of the low-resistivity bed. In another example, the environmental effects can include invasion of the well bore, such as mud invasion resulting from fractures caused by drilling fluid or preexisting fractures. The environmental effects can include resistive anisotropy of the subsurface, which may result in misleading effects in resistivity measurements. The data processing system is configured to recognize features in the LWD data that represent these or other environmental effects and classify the features as representing those respective environmental effects in the LWD data. Generally, the data processing system can process the LWD data to perform a data correction in response to identifying the environmental effects. The resulting corrected LWD provides a more accurate representation of the well bore (such as a more accurate resistivity profile) than the uncorrected or raw LWD data. The data processing system (or another computing device or system) can be configured to process the corrected LWD data for one or more seismic applications related to drilling, subsurface imaging, and so forth.

The data processing system is configured to automatically determine which environmental effects are occurring in the wireline or LWD data as represented in resistivity log responses in vertical and HAHZ wells. The data processing system is configured to automatically identify that the environmental effect occurred based on features in the wireline or LWD data and generate an alert or otherwise flag the data corresponding to the identified environmental effect.

The data processing system is configured for consistent detection of environmental effects on wireline and LWD resistivity measurements for a plurality of well bores in a subterranean environment. The data processing system is configured for perform a correction to the LWD and/or wireline data based on the determined or identified environmental effect. The data processing system is configured to operate independent from individual judgement of users that causes possible inconsistencies between the logs in different wells across the same field or reservoir due to differing judgements of different experts. The data processing system is configured to prepare the LWD data and/or wireline data for resistivity modeling in order to extract a true resistivity profile ($R_t$) by correcting the LWD/wireline data for the correct (such as dominant) environmental effect impacting the resistivity data. The LWD data can be corrected to determine Rt using the following processes. Extensive work and computational advances provide the oil and gas industry with codes to model resistivity tools in a wide variety of formations/conditions. The workflow used includes a model-compare-update approach and provides an interface where a layered earth model (e.g., including layer geometry and property) is constructed. The layered earth model assumes that the layers are laterally extensive and that the properties of each layer do not change. When the same layer is crossed multiple times in a high angle or horizontal well, variations of properties are observed along the well path. When this occurs, lateral property boundaries are inserted into the model. After several iterations, and when an agreement between the forward model and measured logs has been achieved, the structural model is confirmed and assigned layer properties. Confidence indication is provided based on reconstruction of actual data to modeled data.

The data processing system is configured for automatic identification and flagging of the different environmental effects on wireline and LWD data through a supervised machine learning approach. The machine learning model is trained to recognize the different environmental effects (such as invasion, shoulder bed, anisotropy, etc.) that can affect resistivity measurements. The data processing system is configured to use the trained machine learning model to identify, for new resistivity data, any dominant environmental effect(s). The determination of the environmental effects can determine what processing steps are taken for a resistivity modeling workflow to extract $R_t$. $R_t$ represents a true resistivity of the subterranean formation that is used for accurate hydrocarbon saturation estimation.

In some implementations, the data processing system is configured to update the LWD/wireline data to correct for environmental effects or otherwise update a downstream processing workflow for generating the true resistivity profile for a given well bore.

The machine learning models used can include supervised learning models. The data processing system is configured to train the model using resistivity data samples that are each labeled with corresponding environmental effects for being identified by the model. The machine learning model is configured to classify the resistivity data based on the samples received in the training data. The machine learning model is configured to define classification rules based on resistivity signatures (such as common patterns) found in the data samples without explicitly programming the signatures.

The data processing system is configured to build a database of wireline and LWD resistivity measurements. The machine learning model is configured to iteratively train over time using the stored data. The classification of various environmental effects in the stored training data are already flagged. New resistivity data is automatically added by various instances of the processing workflow of the data processing system, further enriching the reference of the supervised training.

FIG. 1 is schematic view of an LWD system which provides real-time data from measurements made by a LWD tool 110 near the drill bit to a computer 102 during the drilling process in a subterranean formation 100 across multiple geological layers 104, 106 and 108. The LWD tools provide formation measurements such as gamma ray, resistivity, density and neutron-porosity of the formation. In some implementations, the LWD sensors are rotating. In the LWD field, real-time (RT) refers to the data transmitted through a mud column 112, compared to recorded-mode data which is stored in tool memory. LWD measurements are made soon after drilling. The LWD measurements are taken before formation alteration, such as before wash out of the borehole or fluid invasion. LWD tools are often run in high angle boreholes often crossing beds/layers 104, 106, 108. Resistivity response is sensitive to the angle the well bore intersects the formation beds/layers 104, 106, 108 and the thickness of the bed in addition to a type of the formation. Due to the shape of the phase and attenuation volumes of investigation, phase resistivity has a higher vertical resolution than attenuation resistivity. However, the attenuation resistivity has a deeper depth of investigation than the phase resistivity.

Figure 2:
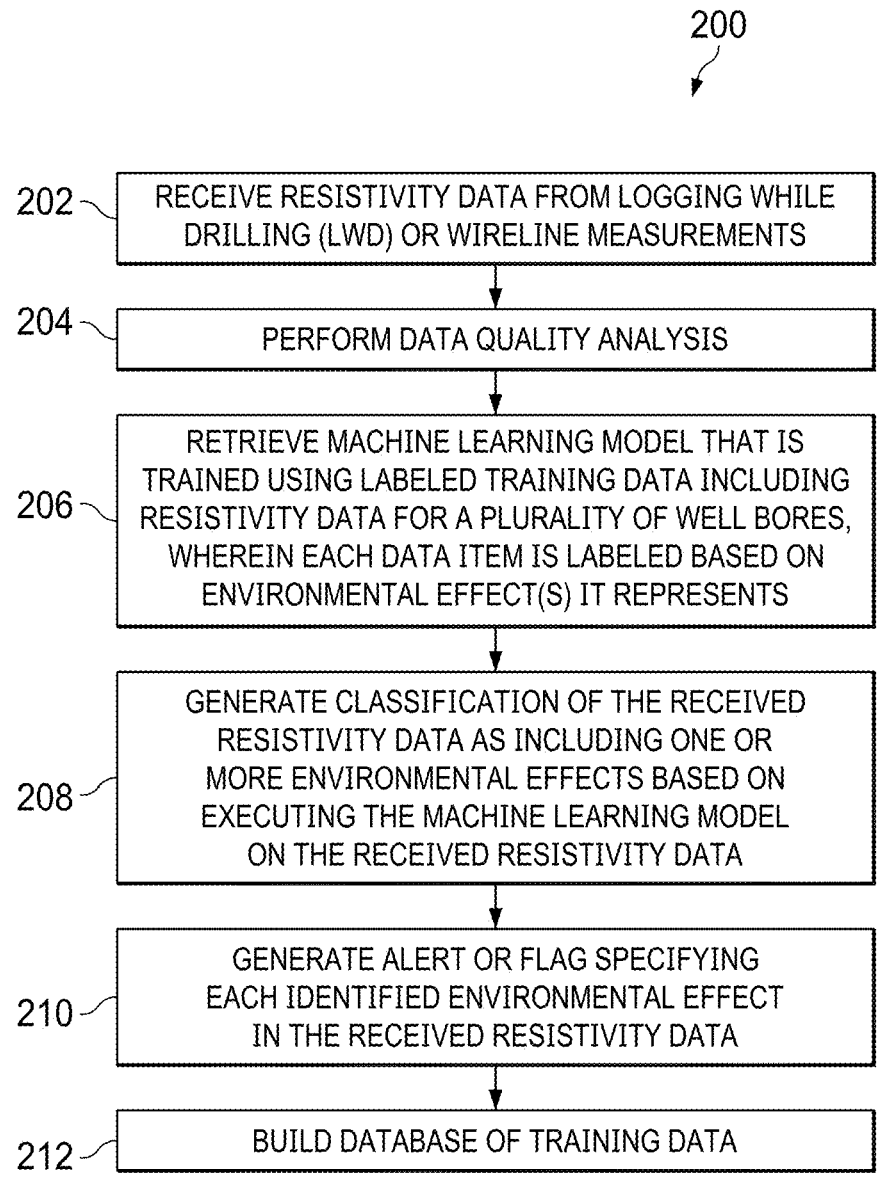
FIG. 2 show a process for identifying environmental effects in LWD and/or wireline data using a machine learning model.

Turning to FIG. 2, a process 200 for identifying environmental effects in LWD and/or wireline data is shown. A data processing system receives (202) LWD or wireline data including resistivity data from a well bore. The resistivity data can be measured using one or more electrodes in the well bore or near the well bore. The resistivity data includes a measure of resistivity of the subsurface (such as rock and soil) at one or more positions in the subsurface. The resistivity values can be associated with those positions in the subsurface. In some implementations, the data inputs to the supervised machine learning model, including data types such as the resistivity data gathered from a resistivity logging tool (such as downhole).

The data processing system performs (204) a data quality check or data quality analysis for the received resistivity data. The data quality check ensures that the resistivity measurements are clean from any anomalies or irregularities. This can include checking the data for missing data, out of range values or values that indicate that a sensor is saturated or malfunctioning, unexpected value fluctuations, and so forth. Additionally, resistivity borehole corrections for borehole size and mud resistivity are applied.

The data processing system retrieves (206) a machine learning model that is trained with labeled resistivity data. The machine learning model is provided labeled resistivity data as training data. Each set of training data is labeled with one or more environmental effects represented in the training data. The machine learning model is configured to recognize one or more data signatures associated with each environmental effect.

Figure 3:
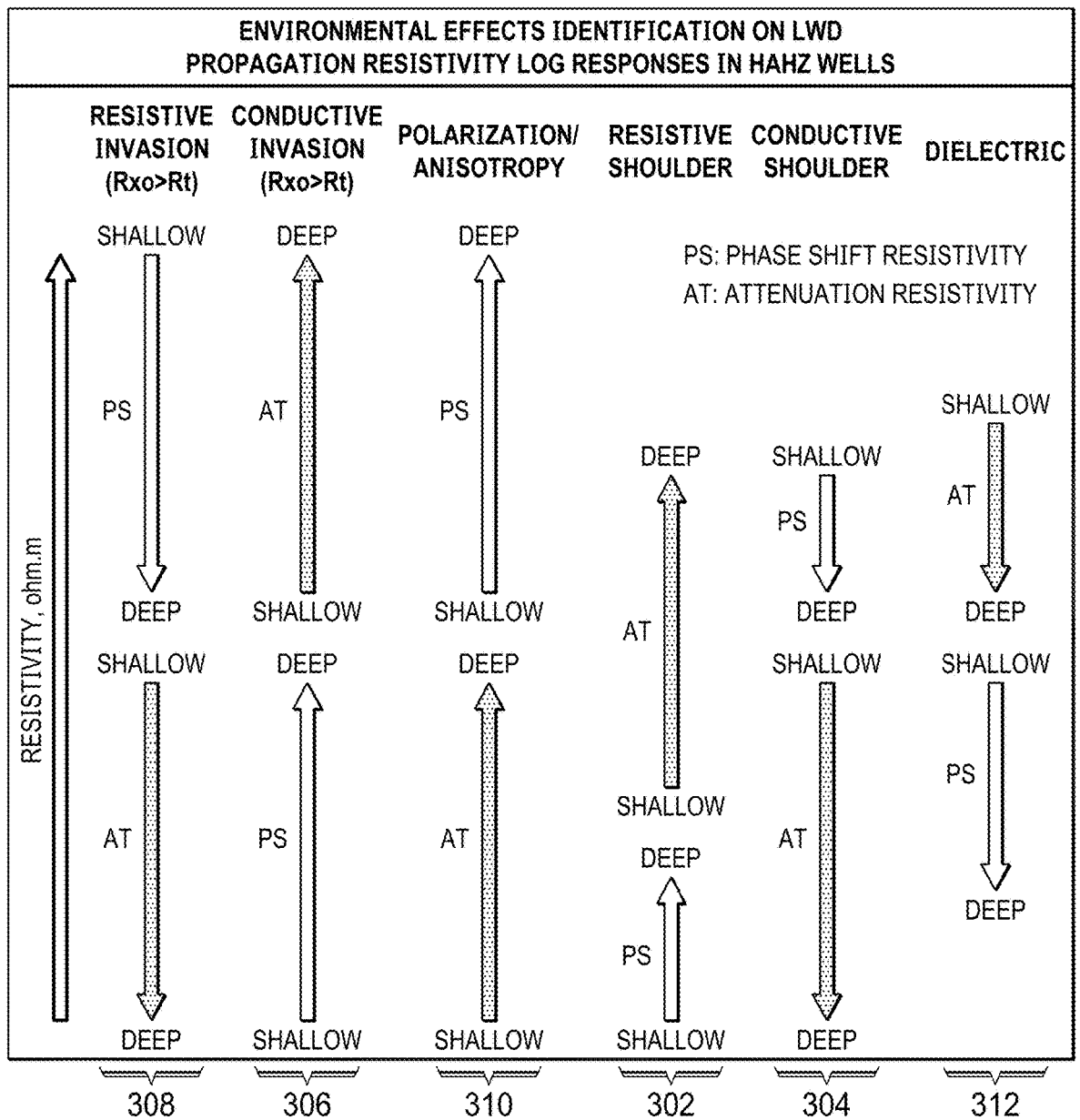
FIG. 3 shows an image illustrating examples of data signatures for corresponding environmental effects.

FIG. 3 shows an image 300 including examples of data signatures for corresponding environmental effects. For example, a data signature 302 representing a resistive shoulder-bed (or adjacent bed) effect may include an increased resistivity phase shift and an increased attenuation resistivity from shallow locations to deep locations for a resistive shoulder. For a conductive shoulder bed data signature 304, the opposite is true: there is a reduced resistivity phase shift and attenuation resistivity from shallow locations to deep locations. For example, a data signature 306 representing a conductive well-invasion effect may include increased resistivity phase shift and an increased attenuation resistivity from shallow locations to deep locations. For example, a data signature 308 representing a resistive well-invasion effect may include increased resistivity phase shift and an increased attenuation resistivity from shallow locations to deep locations. For example, a data signature 310 representing a subsurface anisotropy or polarization effect may include increased resistivity phase shift and an increased attenuation resistivity from shallow locations to deep locations. In an example, a dielectric effect data signature 312 is a reduced resistivity phase shift and attenuation resistivity from shallow locations to deep locations.

The machine learning model is trained using the training data. In some implementations, the machine learning model is trained using data besides resistivity data. For example, the training data can include neutron data, sonic data, or any other data that is measured in LWD data or wireline data. In such cases, the training data are configured to represent data signatures in the sonic data, neutron data, etc., and the machine learning model is configured to analyze new sonic data, neutron data, etc. for classification and/or identification of environmental effects. The LWD propagation phase and attenuation resistivity measurements enable the respective environmental effects to be identified in the LWD or wireline data.

The data processing system is configured to generate (208) one or more classification values for associating with the LWD data. The classification values can be probability values. In some implementations, the output data include a confusion matrix. The classification values represent a likelihood that a given environmental effect is included in the LWD data. The data processing system generates the classification value(s) for the LWD data by applying the machine learning model (such as executing machine learning model logic) on the LWD data. The LWD can be input into the machine learning model, which then outputs the classification values. Examples of the machine learning models used can include support vector machines (SVMs), Bayes models, decision forests, and regression models such as linear or logistic models. In some implementations, a random forest model (machine learning technique) is used. Resistivity data represent input data without any initial preprocessing.

The data processing system is configured to generate (210) an indication, such as an alert or flag, specifying each environmental effect detected in a particular set of data (such as for a well). The one or more flags or alerts are associated with the LWD or wireline data. The flags can be input into a workflow configured to correct the LWD data to remove the environmental effects or to otherwise compensate data processing to determine the true resistivity profile for the well. The true resistivity profile, $R_t$, is used to determine hydrocarbon saturation in the subsurface near the well. The profile $R_t$ is used to guide drilling or exploration activities, reducing exploration and drilling costs.

In some implementations, the data processing system is configured to build (212) a database of training data Additionally and part of the process is to build a database of wireline and LWD resistivity measurements, where the classification of all the environmental effects are existing and already flagged and where also new resistivity data is automatically added, further enriching the reference of the supervised training.

FIG. 4 shows graphs 400, 410, each illustrating examples of LWD data. Graph 400 shows attenuation resistivity data for depths between about 6500 and 9500 feet (ft.) of depth in the subsurface. Values are shown in ohm-meters. Graph 410 shows phase resistivity values for well depths between about 6500 and 9500 ft. of depth in the subsurface. Values are shown in ohm-meters. These data show examples of data input into the machine learning model previously described. Generally, no preprocessing steps are needed to change the data prior to input into the machine learning model. For example, both phase shift and attenuation resistivity are used as inputs to the machine learning model.

In an example, the data from each of graphs 400, 410 is input into a respective, trained machine learning model that is trained with either attenuation resistivity data or phase resistivity data, respectively.

Figure 5A:
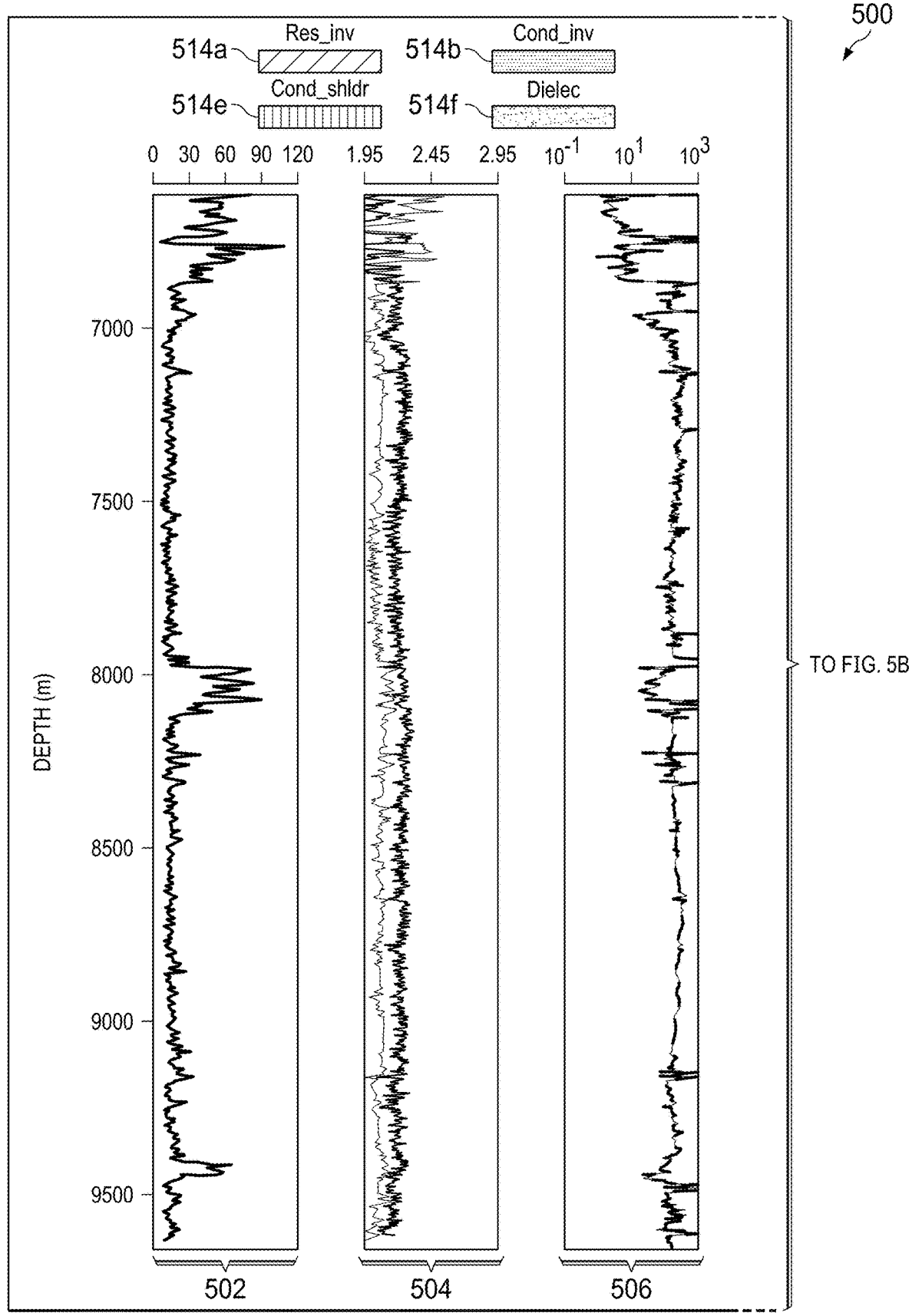
FIGS. 5A and 5B together show example training data.
Figure 5B:
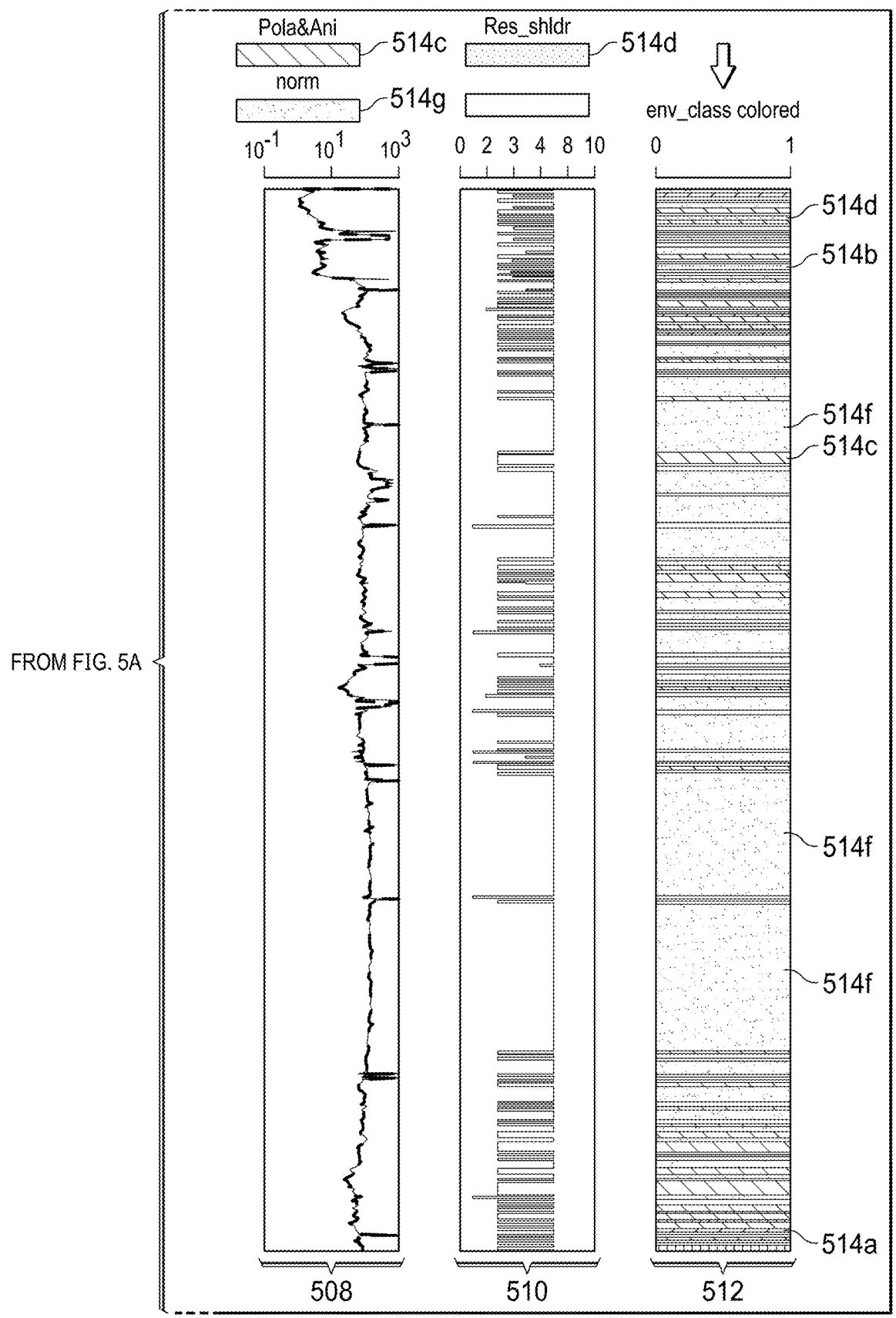

FIGS. 5A and 5B together show an image 500 representing an example of labeled training data that is used for training a machine learning model for the data processing system. Channel 502 shows an example of resistivity data for depths from about 6500 ft. to about 9500 ft. of depth in the subsurface. Channel 504 represents the neutron (blue) and the density (red) curves. Channel 506 represents the phase resistivity curves. Channel 508 represents the attenuation resistivity curves. Channel 510 represents a classification output indicating whether an environmental effect is present at a given depth in the subsurface. For example, if an effect is present, the classification channel 510 shows a high value (or a value representing a raised flag). If no effect is present, the classification channel shows a low value (no flag raised). This corresponds to channel 512, showing a labeled classification of the particular environmental effect. Each shade in channel 512 corresponds to an environmental effect. For example, environmental effects include resistive invasion 514a, conductive invasion 514b, polarization/anisotropy 514c, resistive shoulder 514d, conductive shoulder 514e, dielectric 514e, or normal 514f (such as no effect detected). The effects are labeled in channel 512.

Figure 6:
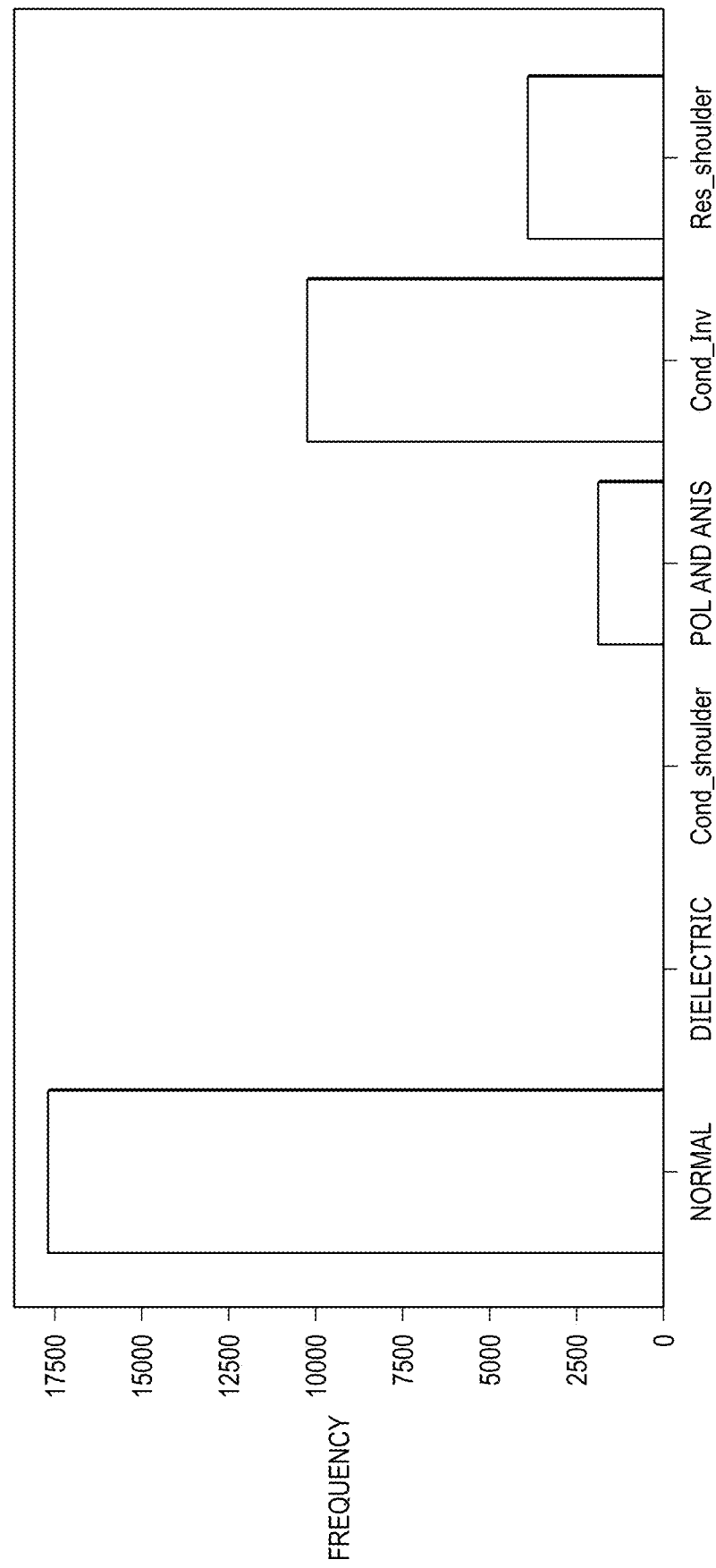
FIG. 6 shows a graph illustrating example classification outputs.

FIG. 6 shows a graph 600 representing classification outputs. In graph 600, a frequency for each type of environmental effect (or lack thereof) is shown. Frequency values represent a number of times the environmental effect is detected at a given depth in the data set. Each bar represents a respective environmental effect (such as effects 514a-f of FIGS. 5A-5B).

Figure 7:
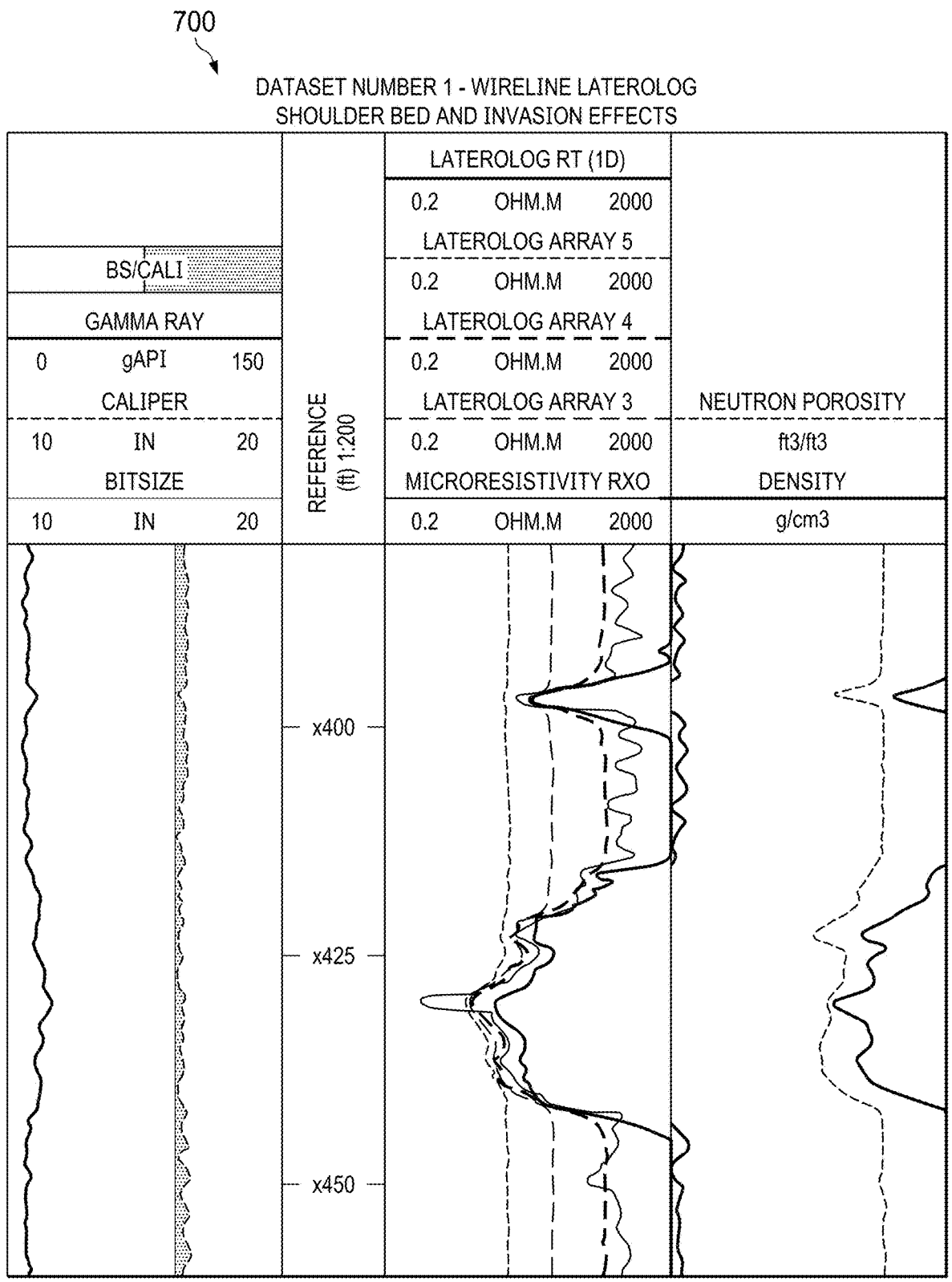
FIG. 7 shows example LWD data for classification.

FIG. 7 shows a graph 700 illustrating example wireline data in which environmental effects are detected. In graph 700, the wireline data represent triple combination well logs across a series of tight anhydrite layers and thinner porous carbonates. The data show shoulder bed and invasion effects. The environmental effects are detected from these data where data signatures in the data show each effect is manifesting. The environmental effects are detected following a certain behavior and signature of the phase and attenuation resistivity data, shown in the trends of FIG. 3.

Figure 8:
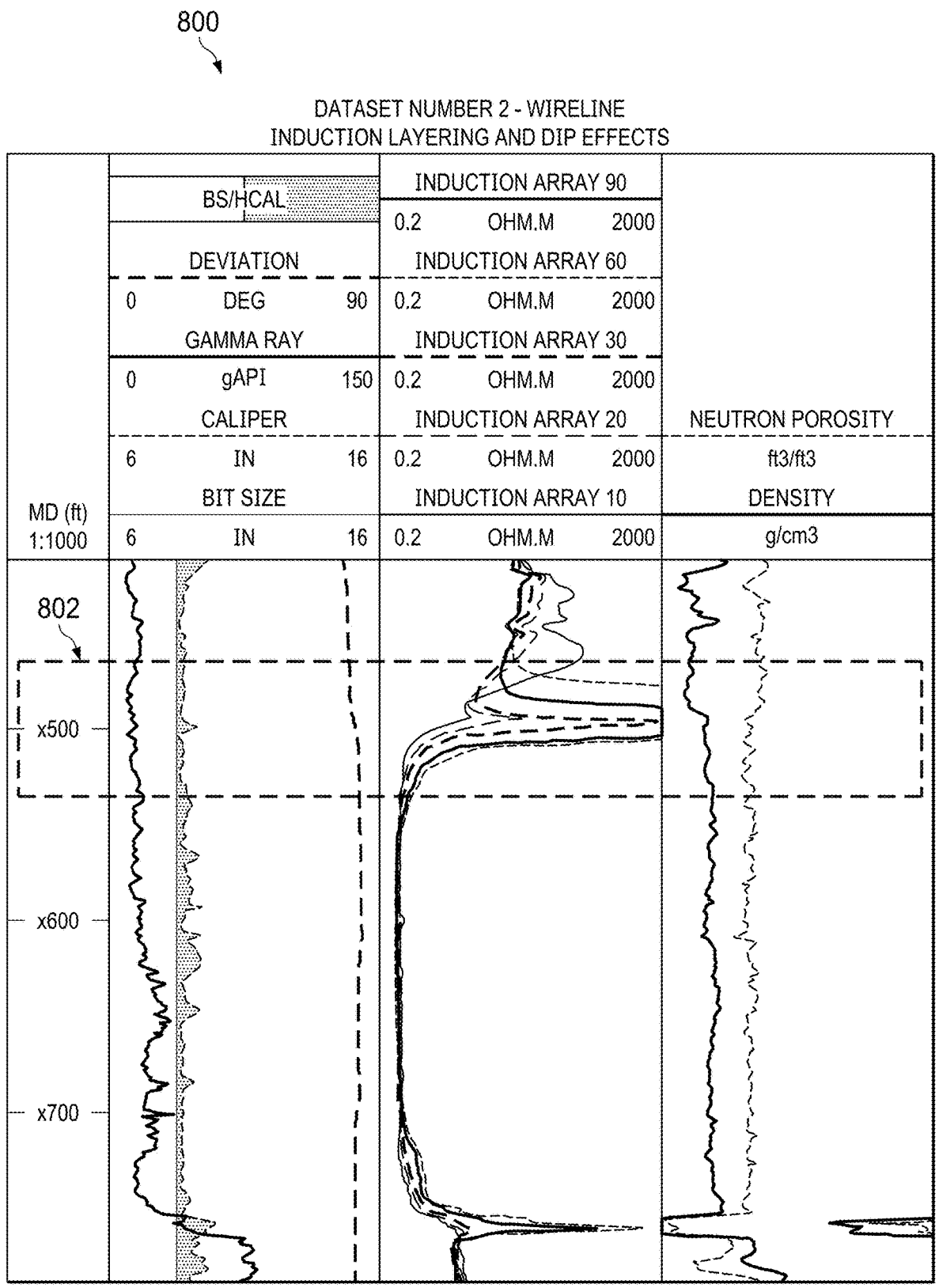
FIG. 8 shows example LWD data for classification.

FIG. 8 shows a graph 800 illustrating example wireline data in which environmental effects are detected. In graph 800, the data are presented from triple combination logs across a sequence of clean sandstone and shale layers. The data in region 802 include a polarization horn on the induction logs at the oil-water contact (OWC) depth. The depth discrepancy is shown between the OWC from the deep induction logs and the neutron-density logs. The features the machine learning model generally extracts are the trends exhibited by the phase and attenuation resistivity data that correspond to a specific environmental effect.

Figure 9:
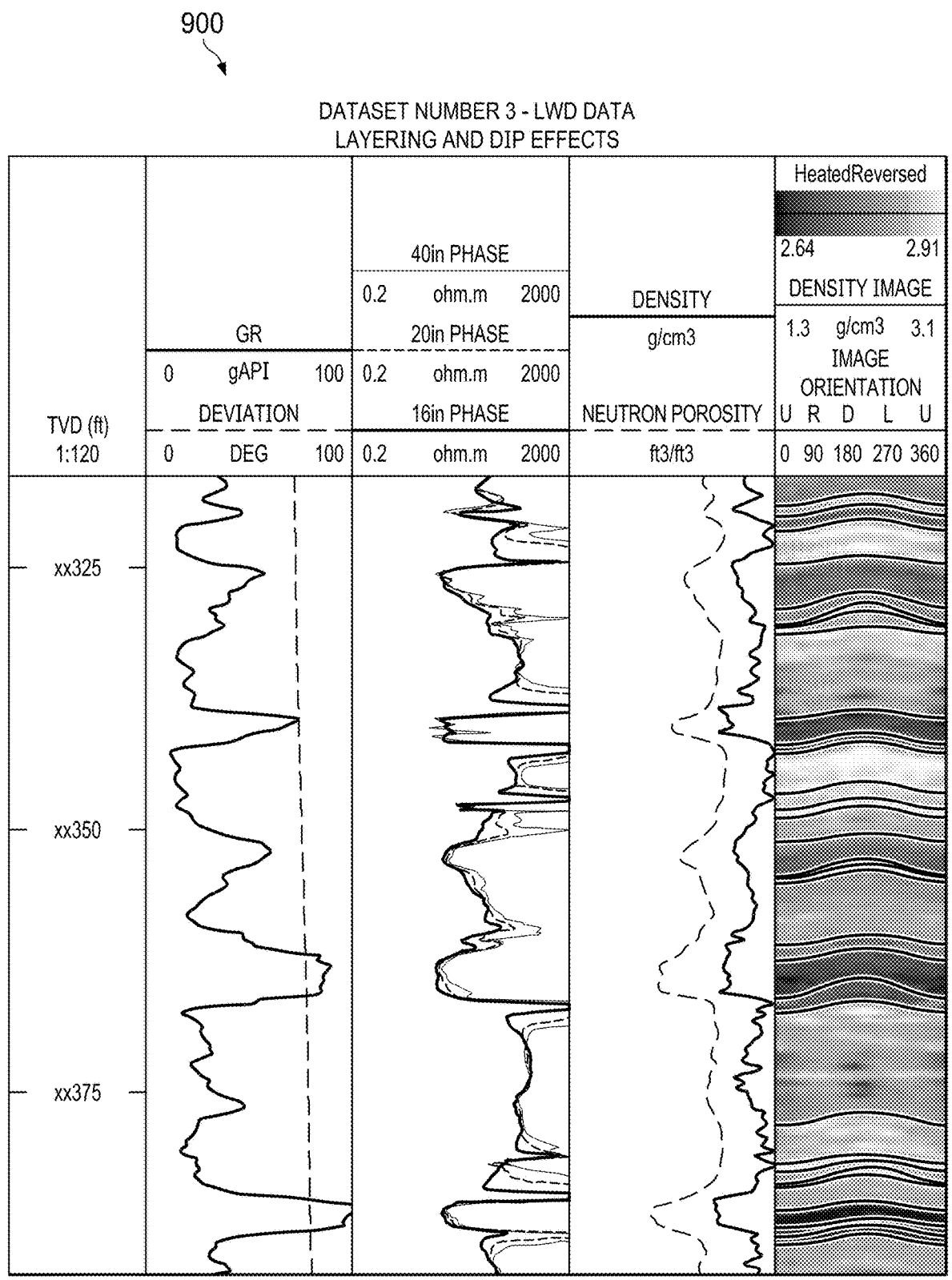
FIG. 9 shows example LWD data for classification.

FIG. 9 shows a graph 900 illustrating example LWD data in which environmental effects are detected. In graph 900, the data are presented from triple combination logs across a sequence of carbonate and shale layers. The features the machine learning model extracts are the trends exhibited by the phase and attenuation resistivity data that correspond to a specific environmental effect.

Figure 10:
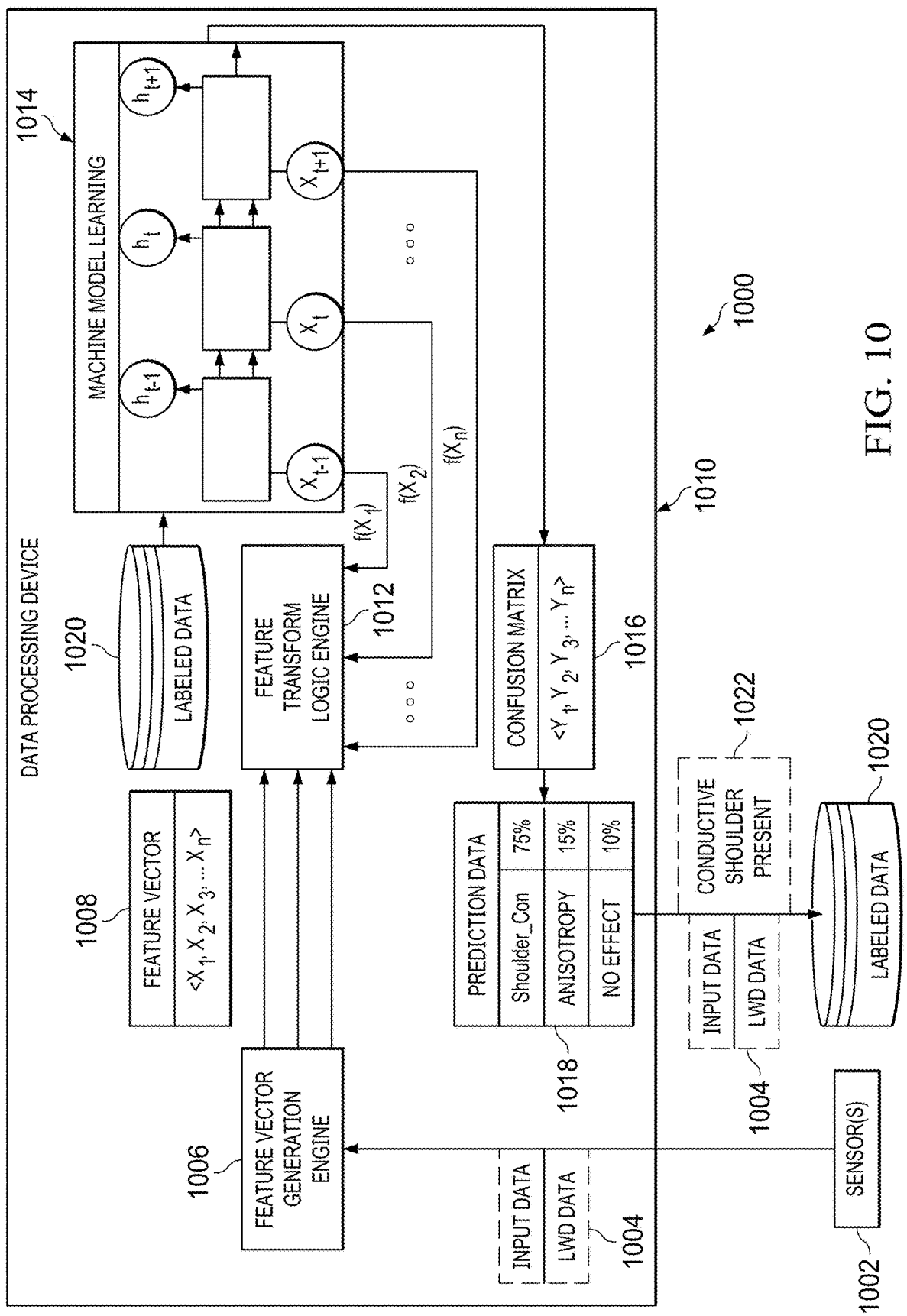
FIG. 10 shows an example data processing system.

FIG. 10. represents a data processing system 1000 for performing the processes described in this specification. In the data processing system 1000, sensor(s) 1002 are configured to measure LWD data. The sensor(s) 1002 can include, for example, electrodes that are placed downhole in the well bore. The input data 1004 includes the LWD data previously described. In this example, a support vector machine (SVM) is being used as the machine learning model. In this example, the input data are transformed into a vector by the feature vector generation engine 1006 so that the input data is in a format that can be processed by the SVM machine learning model 1014. The machine learning model 1014 is trained with labeled data 1020, such as from a data store. The data processing system 1000 generates a feature vector 1008 that represents the LWD in vector form. If any additional preprocessing are required to prepare the values from the LWD for processing by the machine learning model 1014, the feature transform logic engine 1012 is configured to do so. The engine 1012 is configured to adjust the format of any input data as needed for the particular machine learning model selected for processing the LWD data.

The machine learning model 1014, trained by labeled data 1020, is configured to receive the feature vector 1008 (or a transformed version of the vector) representing the LWD data and output classification results 1016. The results 1016 can include a confusion matrix representing classification outcomes for each of the possible outputs. For example, here, three environmental effects are shown as possible including a conductive shoulder, anisotropy, or no effect (though generally more effects can be analyzed as previously described). As shown in prediction data 1018, a probability or weight value is associated with each outcome. Here, a conductive shoulder effect is weighted with the greatest value. The data processing system 1000 outputs a classification that the conductive shoulder is present in output data 1022. The label 1022 is used to label the data 1004 and stored in database 1020 as labeled data.

Figure 11:
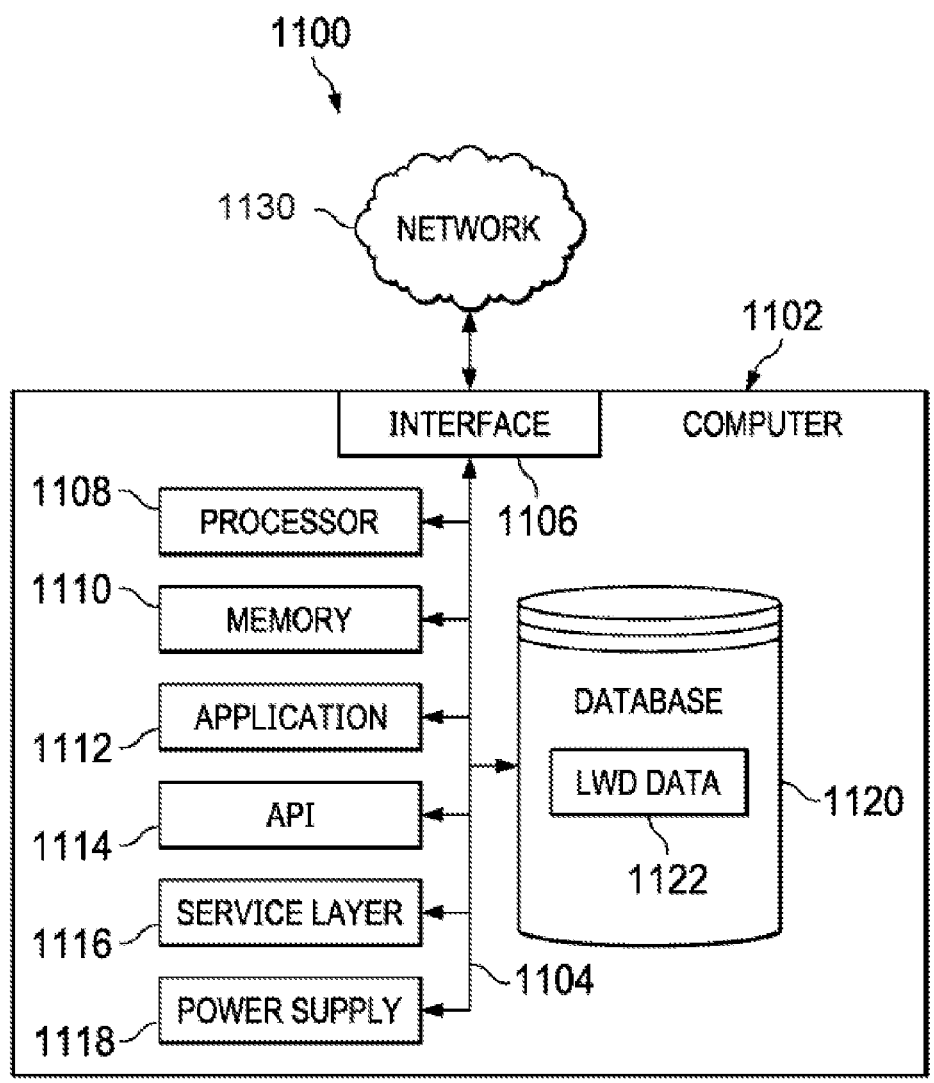
FIG. 11 is a block diagram illustrating an example computer system used to provide computational functionalities associated with described algorithms, methods, functions, processes, flows, and procedures as described in the present disclosure, according to some implementations of the present disclosure.

FIG. 11 is a block diagram of an example data processing system 1100 used to provide computational functionalities associated with described algorithms, methods, functions, processes, flows, and procedures described in the present disclosure, according to some implementations of the present disclosure. The illustrated computer 1102 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1102 can include input devices such as keypads, keyboards, and touch screens that can accept user information. Also, the computer 1102 can include output devices that can convey information associated with the operation of the computer 1102. The information can include digital data, visual data, audio information, or a combination of information. The information can be presented in a graphical user interface (UI) (or GUI).

The computer 1102 can serve in a role as a client, a network component, a server, a database, a persistency, or components of a computer system for performing the subject matter described in the present disclosure. The illustrated computer 1102 is communicably coupled with a network 1130. In some implementations, one or more components of the computer 1102 can be configured to operate within different environments, including cloud-computing-based environments, local environments, global environments, and combinations of environments.

At a high level, the computer 1102 is an electronic computing device operable to receive, transmit, process, store, and manage data and information associated with the described subject matter. According to some implementations, the computer 1102 can also include, or be communicably coupled with, an application server, an email server, a web server, a caching server, a streaming data server, or a combination of servers.

The computer 1102 can receive requests over network 1130 from a client application (for example, executing on another computer 1102). The computer 1102 can respond to the received requests by processing the received requests using software applications. Requests can also be sent to the computer 1102 from internal users (for example, from a command console), external (or third) parties, automated applications, entities, individuals, systems, and computers.

Each of the components of the computer 1102 can communicate using a system bus 1104. In some implementations, any or all of the components of the computer 1102, including hardware or software components, can interface with each other or the interface 1106 (or a combination of both), over the system bus 1104. Interfaces can use an application programming interface (API) 1114, a service layer 1116, or a combination of the API 1114 and service layer 1116. The API 1114 can include specifications for routines, data structures, and object classes. The API 1114 can be either computer-language independent or dependent. The API 1114 can refer to a complete interface, a single function, or a set of APIs.

The service layer 1116 can provide software services to the computer 1102 and other components (whether illustrated or not) that are communicably coupled to the computer 1102. The functionality of the computer 1102 can be accessible for all service consumers using this service layer. Software services, such as those provided by the service layer 1116, can provide reusable, defined functionalities through a defined interface. For example, the interface can be software written in JAVA, C++, or a language providing data in extensible markup language (XML) format. While illustrated as an integrated component of the computer 1102, in alternative implementations, the API 1114 or the service layer 1116 can be stand-alone components in relation to other components of the computer 1102 and other components communicably coupled to the computer 1102. Moreover, any or all parts of the API 1114 or the service layer 1116 can be implemented as child or sub-modules of another software module, enterprise application, or hardware module without departing from the scope of the present disclosure.

The computer 1102 includes an interface 1106. Although illustrated as a single interface 1106 in FIG. 11, two or more interfaces 1106 can be used according to particular needs, desires, or particular implementations of the computer 1102 and the described functionality. The interface 1106 can be used by the computer 1102 for communicating with other systems that are connected to the network 1130 (whether illustrated or not) in a distributed environment. Generally, the interface 1106 can include, or be implemented using, logic encoded in software or hardware (or a combination of software and hardware) operable to communicate with the network 1130. More specifically, the interface 1106 can include software supporting one or more communication protocols associated with communications. As such, the network 1130 or the hardware of the interface can be operable to communicate physical signals within and outside of the illustrated computer 1102.

The computer 1102 includes a processor 1108. Although illustrated as a single processor 1108 in FIG. 11, two or more processors 1108 can be used according to particular needs, desires, or particular implementations of the computer 1102 and the described functionality. Generally, the processor 1108 can execute instructions and can manipulate data to perform the operations of the computer 1102, including operations using algorithms, methods, functions, processes, flows, and procedures as described in the present disclosure.

The computer 1102 also includes a database 1120 that can hold data (for example, seismic data 1122) for the computer 1102 and other components connected to the network 1130 (whether illustrated or not). For example, database 1120 can be an in-memory, conventional, or a database storing data consistent with the present disclosure. In some implementations, database 1120 can be a combination of two or more different database types (for example, hybrid in-memory and conventional databases) according to particular needs, desires, or particular implementations of the computer 1102 and the described functionality. Although illustrated as a single database 1120 in FIG. 11, two or more databases (of the same, different, or combination of types) can be used according to particular needs, desires, or particular implementations of the computer 1102 and the described functionality. While database 1120 is illustrated as an internal component of the computer 1102, in alternative implementations, database 1120 can be external to the computer 1102.

The computer 1102 also includes a memory 1110 that can hold data for the computer 1102 or a combination of components connected to the network 1130 (whether illustrated or not). Memory 1110 can store any data consistent with the present disclosure. In some implementations, memory 1110 can be a combination of two or more different types of memory (for example, a combination of semiconductor and magnetic storage) according to particular needs, desires, or particular implementations of the computer 1102 and the described functionality. Although illustrated as a single memory 1110 in FIG. 11, two or more memories 1110 (of the same, different, or combination of types) can be used according to particular needs, desires, or particular implementations of the computer 1102 and the described functionality. While memory 1110 is illustrated as an internal component of the computer 1102, in alternative implementations, memory 1110 can be external to the computer 1102.

The application 1112 can be an algorithmic software engine providing functionality according to particular needs, desires, or particular implementations of the computer 1102 and the described functionality. For example, application 1112 can serve as one or more components, modules, or applications. Further, although illustrated as a single application 1112, the application 1112 can be implemented as multiple applications 1112 on the computer 1102. In addition, although illustrated as internal to the computer 1102, in alternative implementations, the application 1112 can be external to the computer 1102.

The computer 1102 can also include a power supply 1118. The power supply 1118 can include a rechargeable or non-rechargeable battery that can be configured to be either user- or non-user-replaceable. In some implementations, the power supply 1118 can include power-conversion and management circuits, including recharging, standby, and power management functionalities. In some implementations, the power-supply 1118 can include a power plug to allow the computer 1102 to be plugged into a wall socket or a power source to, for example, power the computer 1102 or recharge a rechargeable battery.

There can be any number of computers 1102 associated with, or external to, a computer system containing computer 1102, with each computer 1102 communicating over network 1130. Further, the terms "client," "user," and other appropriate terminology can be used interchangeably, as appropriate, without departing from the scope of the present disclosure. Moreover, the present disclosure contemplates that many users can use one computer 1102 and one user can use multiple computers 1102.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for drilling a well into a subsurface formation, the method comprising:
    performing a downhole measurement with a sensor to generate measured logging-while-drilling (LWD) data;
    retrieving a machine learning model that is trained using labeled LWD data, the labeled LWD data representing normal LWD data and LWD data associated with one or more environmental effects each causing a respective data signature in the LWD data, each respective data signature comprising a change in resistivity phase shift and attenuation resistivity, each respective data signature being associated with a corresponding label identifying the environmental effect, the normal LWD data being associated with no environmental effects;
    inputting the LWD data, generated based on the downhole measurement, into the machine learning model;
    generating, by the machine learning model based on the inputting, a classification output identifying at least one environmental effect represented in the LWD data, the classification output identifying at least one of the respective data signatures,
    wherein the machine learning model is configured to classify the data signature based on each of a first data signature representing a resistive shoulder-bed effect, a second data signature representing a conductive shoulder-bed effect, a third data signature representing a conductive well-invasion effect, a fourth data signature representing a resistive well-invasion effect, a fifth data signature representing a subsurface anisotropy or polarization effect, and a sixth data signature representing a dielectric effect, and the machine learning model selects one of the respective data signatures for the classification output;
    generating, based on the classification output, corrected LWD data that removes the change to the LWD data caused by the environmental effect; and
    controlling drilling of a well into the subsurface based on the corrected LWD data.

2. The method of claim 1, wherein the LWD data includes resistivity data, wherein each respective data signature includes a resistivity phase signature and an associated resistivity attenuation signature, and wherein the corrected LWD data represents a true resistivity value ($R_t$) for the subsurface formation at a location of the downhole measurement.

3. The method of claim 2, wherein the resistivity phase signature represents an increasing or decreasing phase shift resistivity with respect to a baseline phase shift resistivity, and the resistivity attenuation signature represents an increasing or decreasing attenuation resistivity with respect to a baseline attenuation resistivity.

4. The method of claim 1,
    wherein the first data signature represents an increased resistivity phase shift and an increased attenuation resistivity from shallow locations to deep locations for the resistive shoulder-bed effect,
    wherein the second data signature represents a decreased resistivity phase shift and a decreased attenuation resistivity from shallow locations to deep locations for the conductive shoulder bed effect, wherein the third data signature represents an increased resistivity phase shift and an increased attenuation resistivity from shallow locations to deep locations for the conductive well-invasion effect, wherein the fourth data signature represents a decreased resistivity phase shift and a decreased attenuation resistivity from shallow locations to deep locations for the resistive well-invasion effect, wherein the fifth data signature represents an increased resistivity phase shift and an increased attenuation resistivity from shallow locations to deep locations for the subsurface anisotropy or polarization effect, and wherein the sixth data signature represents a reduced resistivity phase shift and a reduced attenuation resistivity from shallow locations to deep locations for the dielectric effect.

5. The method of claim 1, wherein the machine learning model comprises a supervised machine learning model.

6. The method of claim 1, further comprising:
performing a data quality check for the LWD data, the data quality check configured to remove data comprising missing values, out of range values, saturated sensor values, or values from a damaged sensor.

7. The method of claim 1, wherein the sensor comprises an electrode.

8. A system for drilling a well into a subsurface formation, the system comprising:
one or more sensors for generating logging-while-drilling (LWD) data;
one or more processors; and
a memory storing instructions that, when executed by the one or more processors, cause the one or more processors to perform operations comprising:
receiving, from the one or more sensors, the LWD data representing a downhole measurement;
retrieving a machine learning model that is trained using labeled LWD data, the labeled LWD data representing normal LWD data and LWD data associated with one or more environmental effects each causing a respective data signature in the LWD data, each respective data signature comprising a change in resistivity phase shift and attenuation resistivity, each respective data signature being associated with a corresponding label identifying the environmental effect, the normal LWD data being associated with no environmental effects;
inputting the LWD data, generated based on the downhole measurement, into the machine learning model;
generating, by the machine learning model based on the inputting, a classification output identifying at least one environmental effect represented in the LWD data, the classification output identifying at least one of the respective data signatures,
wherein the machine learning model is configured to classify the data signature based on each of a first data signature representing a resistive shoulder-bed effect, a second data signature representing a conductive shoulder-bed effect, a third data signature representing a conductive well-invasion effect, a fourth data signature representing a resistive well-invasion effect, a fifth data signature representing a subsurface anisotropy or polarization effect, and a sixth data signature representing a dielectric effect, and the machine learning model selects one of the respective data signatures for the classification output;

generating, based on the classification output, corrected LWD data that removes the change to the LWD data caused by the environmental effect; and
controlling drilling of a well into the subsurface based on the corrected LWD data.

9. The system of claim 8, wherein the LWD data includes resistivity data, wherein each respective data signature includes a resistivity phase signature and an associated resistivity attenuation signature, and wherein the corrected LWD data represents a true resistivity value ($R_t$) for the subsurface formation at a location of the downhole measurement.

10. The system of claim 9, wherein the resistivity phase signature represents an increasing or decreasing phase shift resistivity with respect to a baseline phase shift resistivity, and the resistivity attenuation signature represents an increasing or decreasing attenuation resistivity with respect to a baseline attenuation resistivity.

11. The system of claim 8,
wherein the first data signature represents an increased resistivity phase shift and an increased attenuation resistivity from shallow locations to deep locations for the resistive shoulder-bed effect, wherein the second data signature represents a decreased resistivity phase shift and a decreased attenuation resistivity from shallow locations to deep locations for the conductive shoulder bed effect, wherein the third data signature represents an increased resistivity phase shift and an increased attenuation resistivity from shallow locations to deep locations for the conductive well-invasion effect, wherein the fourth data signature represents a decreased resistivity phase shift and a decreased attenuation resistivity from shallow locations to deep locations for the resistive well-invasion effect, wherein the fifth data signature represents an increased resistivity phase shift and an increased attenuation resistivity from shallow locations to deep locations for the subsurface anisotropy or polarization effect, and wherein the sixth data signature represents a reduced resistivity phase shift and a reduced attenuation resistivity from shallow locations to deep locations for the dielectric effect wherein the first data signature represents an increased resistivity phase shift and an increased attenuation resistivity from shallow locations to deep locations for the resistive shoulder-bed effect, wherein the second data signature represents a decreased resistivity phase shift and a decreased attenuation resistivity from shallow locations to deep locations for the conductive shoulder bed effect, wherein the third data signature represents an increased resistivity phase shift and an increased attenuation resistivity from shallow locations to deep locations for the conductive well-invasion effect, wherein the fourth data signature represents a decreased resistivity phase shift and a decreased attenuation resistivity from shallow locations to deep locations for the resistive well-invasion effect, wherein the fifth data signature represents an increased resistivity phase shift and an increased attenuation resistivity from shallow locations to deep locations for the subsurface anisotropy or polarization effect, and wherein the sixth data signature represents a reduced resistivity phase shift and a reduced attenuation resistivity from shallow locations to deep locations for the dielectric effect.

12. The system of claim 8, wherein the machine learning model comprises a supervised machine learning model.

13. The system of claim 8, the operations further comprising:
performing a data quality check for the LWD data, the data quality check configured to remove data comprising missing values, out of range values, saturated sensor values, or values from a damaged sensor.

14. The system of claim 8, wherein the one or more sensors comprise an electrode.

15. One or more non-transitory computer readable media storing instructions for drilling a well into a subsurface formation, the instructions, when executed by one or more processors, configured to cause the one or more processors to perform operations comprising:
receiving measured logging-while-drilling (LWD) data during a downhole measurement;
retrieving a machine learning model that is trained using labeled LWD data, the labeled LWD data representing normal LWD data and LWD data associated with one or more environmental effects each causing a respective data signature in the LWD data, each respective data signature comprising a change in resistivity phase shift and attenuation resistivity, each respective data signature being associated with a corresponding label identifying the environmental effect, the normal LWD data being associated with no environmental effects;
inputting the LWD data, generated based on the downhole measurement, into the machine learning model; generating, by the machine learning model based on the inputting, a classification output identifying at least one environmental effect represented in the LWD data, the classification output identifying at least one of the respective data signatures,
wherein the machine learning model is configured to classify the data signature based on each of a first data signature representing a resistive shoulder-bed effect, a second data signature representing a conductive shoulder-bed effect, a third data signature representing a conductive well-invasion effect, a fourth data signature representing a resistive well-invasion effect, a fifth data signature representing a subsurface anisotropy or polarization effect, and a sixth data signature representing a dielectric effect, and the machine learning model selects one of the respective data signatures for the classification output;
generating, based on the classification output, corrected LWD data that removes the change to the LWD data caused by the environmental effect; and
causing drilling a well into the subsurface based on the corrected LWD data.

16. The one or more non-transitory computer readable media of claim 15, wherein the LWD data includes resistivity data, wherein each respective data signature includes a resistivity phase signature and an associated resistivity attenuation signature, and wherein the corrected LWD data represents a true resistivity value (Rt) for the subsurface formation at a location of the downhole measurement.

17. The one or more non-transitory computer readable media of claim 16, wherein the resistivity phase signature represents an increasing or decreasing phase shift resistivity with respect to a baseline phase shift resistivity, and the resistivity attenuation signature represents an increasing or decreasing attenuation resistivity with respect to a baseline attenuation resistivity.

18. The one or more non-transitory computer readable media of claim 15,
wherein the first data signature represents an increased resistivity phase shift and an increased attenuation resistivity from shallow locations to deep locations for the resistive shoulder-bed effect,
wherein the second data signature represents a decreased resistivity phase shift and a decreased attenuation resistivity from shallow locations to deep locations for the conductive shoulder bed effect,
wherein the third data signature represents an increased resistivity phase shift and an increased attenuation resistivity from shallow locations to deep locations for the conductive well-invasion effect,
wherein the fourth data signature represents a decreased resistivity phase shift and a decreased attenuation resistivity from shallow locations to deep locations for the resistive well-invasion effect,
wherein the fifth data signature represents an increased resistivity phase shift and an increased attenuation resistivity from shallow locations to deep locations for the subsurface anisotropy or polarization effect, and
wherein the sixth data signature represents a reduced resistivity phase shift and a reduced attenuation resistivity from shallow locations to deep locations for the dielectric effect.

\* \* \* \* \*